US008638952B2

(12) United States Patent
Matsuo

(10) Patent No.: US 8,638,952 B2
(45) Date of Patent: Jan. 28, 2014

(54) SIGNAL PROCESSING APPARATUS AND SIGNAL PROCESSING METHOD

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 12/817,406

(22) Filed: Jun. 17, 2010

(65) Prior Publication Data

US 2010/0322437 A1 Dec. 23, 2010

(30) Foreign Application Priority Data

Jun. 23, 2009 (JP) ................................ 2009-148777

(51) Int. Cl.
*H04B 15/00* (2006.01)

(52) U.S. Cl.
USPC .......................... 381/94.2; 381/71.1; 381/104

(58) Field of Classification Search
USPC ............................................ 381/94.2, 86, 92
See application file for complete search history.

(56) References Cited

U.S. PATENT DOCUMENTS

| | | | | |
|---|---|---|---|---|
| 2002/0064287 | A1* | 5/2002 | Kawamura et al. | 381/92 |
| 2006/0056642 | A1* | 3/2006 | Inoue et al. | 381/71.11 |
| 2008/0075300 | A1* | 3/2008 | Isaka | 381/94.2 |
| 2008/0192954 | A1* | 8/2008 | Honji et al. | 381/86 |
| 2008/0219471 | A1* | 9/2008 | Sugiyama et al. | 381/94.2 |
| 2008/0247569 | A1* | 10/2008 | Kondo | 381/94.2 |
| 2009/0055170 | A1 | 2/2009 | Nagahama | |
| 2009/0323925 | A1* | 12/2009 | Sweeney et al. | 379/406.05 |

FOREIGN PATENT DOCUMENTS

| | | |
|---|---|---|
| EP | 0 802 699 | 10/1997 |
| JP | 58-181099 | 10/1983 |
| JP | 11-298988 | 10/1999 |
| JP | 2001-100800 | 4/2001 |
| JP | 4138290 | 6/2008 |
| JP | 4225430 | 12/2008 |
| JP | 2009-20472 | 1/2009 |

OTHER PUBLICATIONS

German Patent Office Action mailed Sep. 1, 2011 for corresponding German Patent Application No. 10 2010 023 615.2.
Japanese Office Action mailed Jan. 22, 2013 in corresponding Patent Application No. 2009-148777.

* cited by examiner

*Primary Examiner* — Duc Nguyen
*Assistant Examiner* — Phan Le
(74) *Attorney, Agent, or Firm* — Staas & Halsey LLP

(57) ABSTRACT

There is provided a signal processing apparatus, for suppressing a noise, which includes a first calculator to obtain a phase difference between two spectrum signals in a frequency domain transformed from sound signals received by at least two microphones to estimate a sound source by the phase difference, a second calculator to obtain a value representing a target signal likelihood and to determine a sound suppressing phase difference range at each frequency, in which a sound signal is suppressed, on the basis of the target signal likelihood, and a filter. The filter generate a synchronized spectrum signal by synchronizing each frequency component of one of the two spectrum signals to each frequency component of the other of the two spectrum signals for each frequency when the phase difference is within the sound suppressing phase difference range and to generate a filtered spectrum signal.

15 Claims, 10 Drawing Sheets

SIGNAL PROCESSING APPARATUS AND SIGNAL PROCESSING METHOD

CROSS-REFERENCE TO RELATED APPLICATION

This application is based upon and claims the benefit of priority of the prior Japanese Patent Application No. 2009-148777, filed on Jun. 23, 2009, the entire contents of which are incorporated herein by reference.

FIELD

The embodiments discussed herein are related to noise suppression processing performed upon a sound signal, and, more particularly, to noise suppression processing performed upon a frequency-domain sound signal.

BACKGROUND

Microphone arrays including at least two microphones receive sound, convert the sound into sound signals, and process the sound signals to set a sound reception range in a direction of a source of target sound or control directivity. As a result, such a microphone array may perform noise suppression or target sound emphasis.

In order to improve an S/N (signal-to-noise) ratio, microphone array apparatuses disclosed in "Microphone Array", *The Journal of the Acoustical Society of Japan*, Vol. 51, No. 5, pp. 384-414, 1995 control directivity and perform subtraction processing or addition processing on the basis of the time difference between signals received by a plurality of microphones. As a result, it is possible to suppress unnecessary noise included in a sound wave transmitted from a sound suppression direction or a direction different from a target sound reception direction and emphasize target sound included in a sound wave transmitted from a sound emphasis direction or the target sound reception direction.

In a speech recognition apparatus disclosed in Japanese Laid-open Patent Publication No. 58-181099, a conversion unit includes at least two speech input units for converting sound into an electric signal, a first speech input unit and a second speech input unit. The first and second speech input units are spaced at predetermined intervals near a speaker. A first filter extracts a speech signal having a predetermined frequency band component from a speech input signal output from the first speech input unit. A second filter extracts a speech signal having the predetermined frequency band component from a speech input signal output from the second speech input unit. A correlation computation unit computes the correlation between the speech signals extracted by the first and second filters. A speech determination unit determines whether a speech signal output from the conversion unit is a signal based on sound output from the speaker or a signal based on noise on the basis of a result of computation performed by the correlation computation unit.

In an apparatus disclosed in Japanese Laid-open Patent Publication No. 11-298988 for controlling a directivity characteristic of a microphone disposed in a speech recognition apparatus used in a vehicle, a plurality of microphones for receiving a plane sound wave are arranged in a line at regular intervals. A microphone circuit processes signals output from these microphones and controls the directivity characteristics of these microphones on the basis of the difference between the phases of plane sound waves input into these microphones so that a sensitivity has a peak in a direction of a talker and a dip in a noise arrival direction.

In a zoom microphone apparatus disclosed in Japanese Patent No. 4138290, a sound pickup unit converts a sound wave into a speech signal. A zoom control unit outputs a zoom position signal corresponding to a zoom position. A directivity control unit changes the directivity characteristic of the zoom microphone apparatus on the basis of the zoom position signal. An estimation unit estimates the frequency component of background noise included in the speech signal converted by the sound pickup unit. On the basis of a result of the estimation performed by the estimation unit, a noise suppression unit adjusts the amount of suppression in accordance with the zoom position signal and suppresses the background noise. At the time of telescopic operation, the directivity control unit changes the directivity characteristic so that target sound is emphasized, and the amount of suppression of background noise included in a speech signal is larger than that at the time of wide-angle operation.

SUMMARY

According to an aspect of the invention, a signal processing apparatus for suppressing a noise using two spectrum signals in a frequency domain transformed from sound signals received by at least two microphones, includes a first calculator to obtain a phase difference between the two spectrum signals and to estimate a sound source direction by the phase difference, a second calculator to obtain a value representing a target signal likelihood and to determine a sound suppressing phase difference range in which a sound signal is suppressed on the basis of the target signal likelihood, and a filter. The filter generates a synchronized spectrum signal by synchronizing each frequency component of one of the spectrum signals to each frequency component of the other of the spectrum signals for each frequency when the phase difference is within the sound suppressing phase difference range and for generating a filtered spectrum signal by subtracting the synchronized spectrum signal from the other of the spectrum signals or adding the synchronized spectrum signal to the other of the spectrum signals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
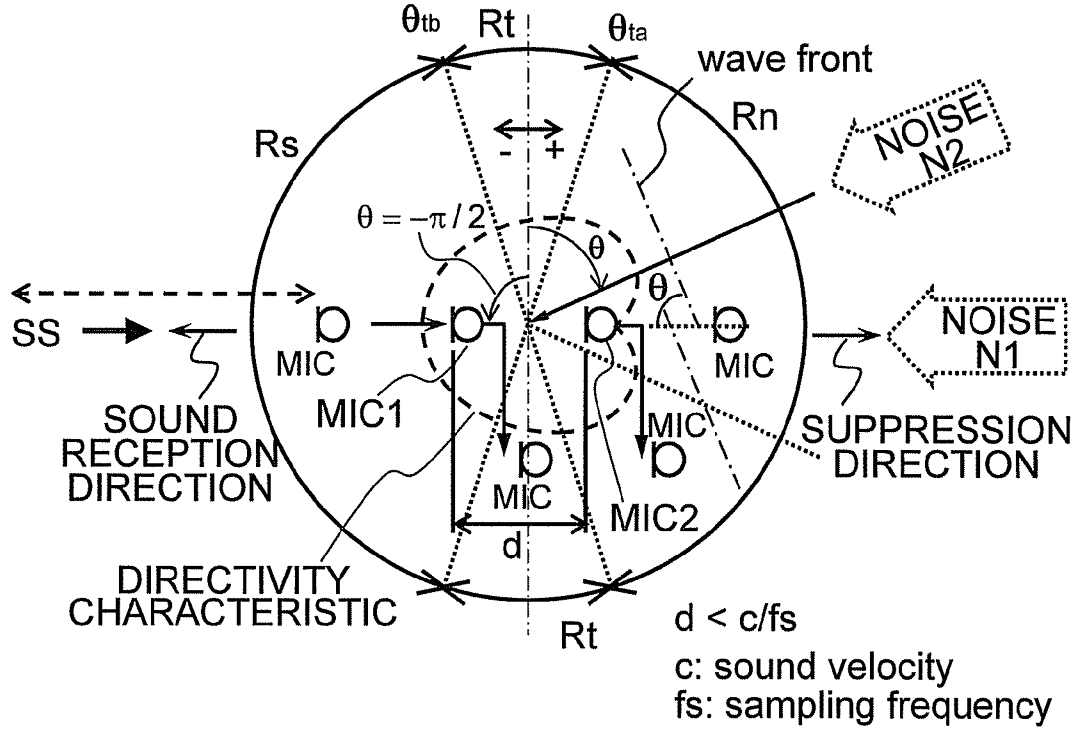
FIG. 1 is a diagram illustrating the arrangement of an array of at least two microphones that are sound input units according to an embodiment of the present invention.

It is to be understood that both the foregoing general description and the following detailed description are exemplary and explanatory and are not restrictive of the invention. An embodiment of the present invention will be described with reference to the accompanying drawings. In the drawings, like or corresponding parts are denoted by like or corresponding reference numerals.

FIG. 1 is a diagram illustrating the arrangement of an array of at least two microphones MIC1 and MIC2 that are sound input units according to an embodiment of the present invention.

A plurality of microphones including the microphones MIC1 and MIC2 are generally spaced a certain distance d apart from each other in a straight line. In this example, at least two adjacent microphones, the microphones MIC1 and MIC2, are spaced the distance d apart from each other in a straight line. On the condition that the sampling theorem is satisfied as will be described later, the distance between adjacent microphones may vary. In an embodiment of the present invention, an exemplary case in which two microphones, the microphones MIC1 and MIC2, are used will be described.

Referring to FIG. 1, a target sound source SS is in a line connecting the microphones MIC1 and MIC2 to each other. The target sound source SS is on the side of the microphone MIC1. A direction on the side of the target sound source SS is a sound reception direction or a target direction of the array of the microphones MIC1 and MIC2. The target sound source SS from which sound to be received is output is typically the mouth of a talker, and a sound reception direction is a direction on the side of the mouth of the talker. A certain angular range in a sound reception angular direction may be set as a sound reception angular range Rs. A direction opposite to the sound reception direction, as illustrated in FIG. 1, may be set as a main suppression direction of noise, and a certain angular range in a main suppression angular direction may be set as a suppression angular range Rn of noise. The suppression angular range Rn of noise may be set for each frequency f.

It is desirable that the distance d between the microphones MIC1 and MIC2 satisfies the sampling theorem or the Nyquist theorem, that is, the condition that the distance $d<c/fs$ where c is a sound velocity and fs is a sampling frequency. Referring to FIG. 1, the directivity characteristic or directivity pattern (for example, a cardioid unidirectional pattern) of the array of the microphones MIC1 and MIC2 is represented by a closed dashed curve. An input sound signal received and processed by the array of the microphones MIC1 and MIC2 depends on a sound wave incidence angle θ in a range $-\pi/2$ to $+\pi/2$ with respect to the straight line in which the microphones MIC1 and MIC2 are arranged and does not depend on an incidence direction, in a range of 0 to $2\pi$, in the direction of the radius of a plane perpendicular to the straight line in which the microphones MIC1 and MIC2 are arranged.

After a delay time $\tau=d/c$ has elapsed from the detection of the sound or speech of the target sound source SS performed by the microphone MIC1 on the left side, the microphone MIC2 on the right side detects the sound or speech of the target sound source SS. On the other hand, after the delay time d/c has elapsed from the detection of a noise N1 from the main suppression direction performed by the microphone MIC2 on the right side, the microphone MIC1 on the left side detects the noise N1. After a delay time $\tau=(d\times\sin\theta)/c$ has elapsed from the detection of a noise N2 from a different suppression direction in the suppression angular range Rn performed by the microphone MIC2 on the right side, the microphone MIC1 on the left side detects the noise N2. An angle θ represents an assumed arrival direction of the noise N2 in the suppression direction. Referring to FIG. 1, an alternate long and short dashed line represents the wave front of the noise N2. The arrival direction of the noise N1 in the case of $\theta=+\pi/2$ is the main suppression direction of an input signal.

In a certain microphone array, it is possible to suppress the noise N1 transmitted from the main suppression direction ($\theta=+\pi/2$) by subtracting an input signal IN2(*t*) received by the microphone MIC2 on the right side from an input signal IN1(*t*) received by the microphone MIC1 on the left side. Here, after the delay time $\tau=d/c$ has elapsed from the input of the input signal IN1(*t*) into the microphone MIC1, the input signal IN2(*t*) inputs into the microphone MIC2. In such a microphone array, however, it is impossible to sufficiently suppress the noise N2 transmitted from an angular direction ($0<\theta<+\pi/2$) different from the main suppression direction.

The inventor has recognized that it is possible to sufficiently suppress the noise N2 included in a sound signal transmitted from a direction in the suppression angular range Rn by synchronizing the phase of one of spectrums of the input sound signals of the microphones MIC1 and MIC2 with the phase of the other one of the spectrums for each frequency in accordance with the phase difference between the two input sound signals and calculating the difference between one of the spectrums and the other one of the spectrums. Furthermore, the inventor has recognized that it is possible to reduce the distortion of a sound signal with suppressed noise by determining the target sound signal likelihood of an input sound signal for each frequency and changing the suppression angular range Rn on the basis of a result of the determination.

Figure 2:
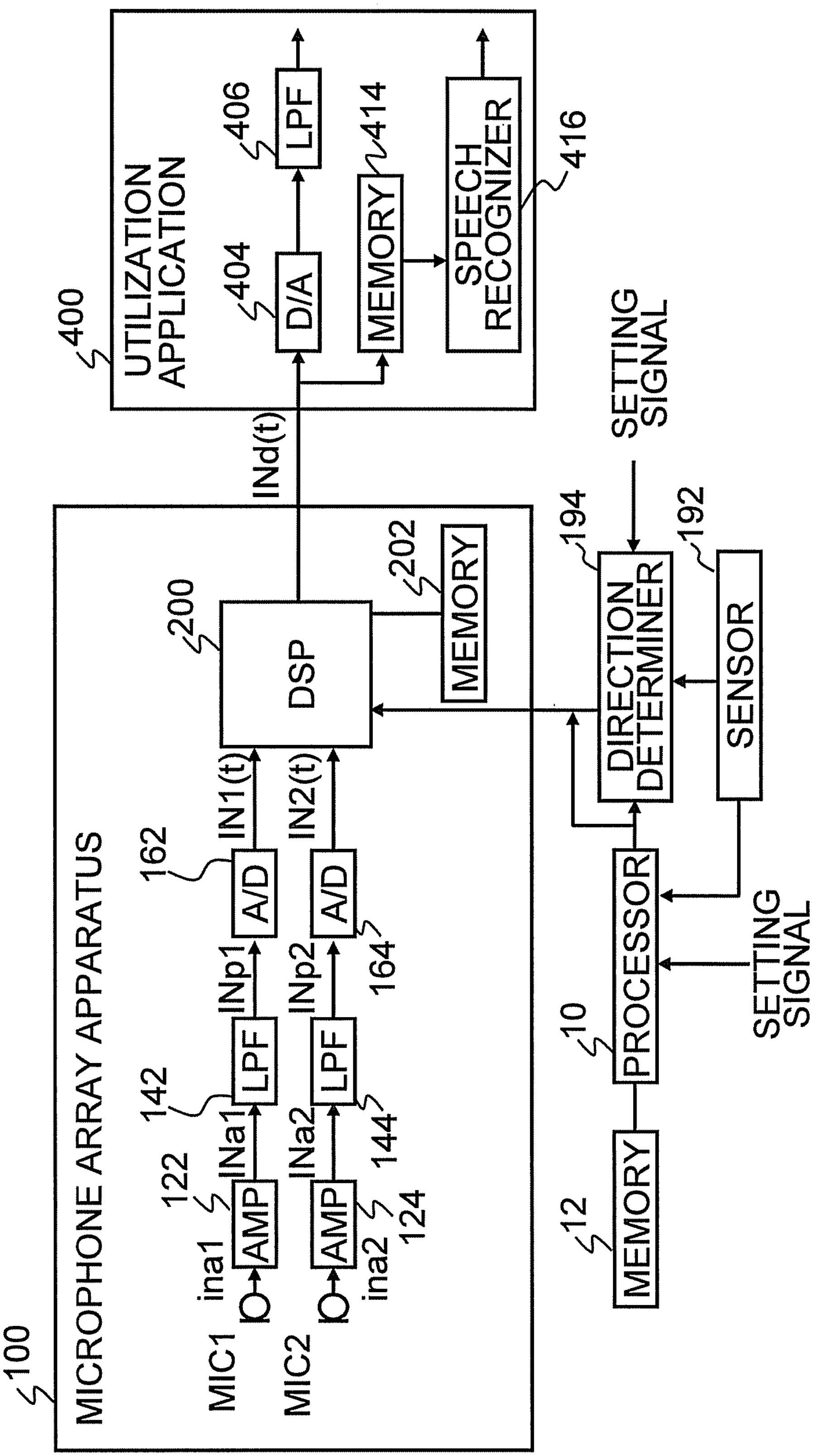
FIG. 2 is a schematic diagram illustrating a configuration of a microphone array apparatus according to an embodiment of the present invention including the microphones illustrated in FIG. 1.

FIG. 2 is a schematic diagram illustrating a configuration of a microphone array apparatus 100 according to an embodiment of the present invention including the microphones MIC1 and MIC2 illustrated in FIG. 1. The microphone array apparatus 100 includes the microphones MIC1 and MIC2, amplifiers 122 and 124, low-pass filters (LPFs) 142 and 144, analog-to-digital converters 162 and 164, a digital signal processor (DSP) 200, and a memory 202 including, for example, a RAM. The microphone array apparatus 100 may be an information apparatus such as a vehicle onboard apparatus having a speech recognition function, a car navigation apparatus, a handsfree telephone, or a mobile telephone.

The microphone array apparatus 100 may be connected to a talker direction detection sensor 192 and a direction determiner 194 or have the functions of these components. A processor 10 and a memory 12 may be included in a single apparatus including a utilization application 400 or in another information processing apparatus. The talker direction detection sensor 192 may be, for example, a digital camera, an ultrasonic sensor, or an infrared sensor. The direction determiner 194 may be included in the processor 10 that operates in accordance with a direction determination program stored in the memory 12.

The microphones MIC1 and MIC2 convert sound waves into analog input signals INa1 and INa2, respectively. The analog input signals INa1 and INa2 are amplified by the amplifiers 122 and 124, respectively. The amplified analog input signals INa1 and INa2 are output from the amplifiers 122 and 124 and are then supplied to the low-pass filters 142 and 144 having a cutoff frequency fc (for example, 3.9 kHz), respectively, in which low-pass filtering is performed for sampling to be performed at subsequent stages. Although only low-pass filters are used, band pass filters or low-pass filters in combination with high-pass filters may be used.

Analog signals INp1 and INp2 obtained by the filtering output from the low-pass filters 142 and 144 are then converted into digital input signals IN1(*t*) and IN2(*t*) in the analog-to-digital converters 162 and 164 having the sampling frequency fs (for example, 8 kHz) (fs>2fc), respectively. The time-domain digital input signals IN1(*t*) and IN2(*t*) output from the analog-to-digital converters 162 and 164, respectively, and are then input into the digital signal processor 200.

The digital signal processor 200 converts the time-domain digital input signals IN1(*t*) and IN2(*t*) into frequency-domain digital input signals or complex spectrums IN1(*f*) and IN2(*f*) by performing, for example, the Fourier transform, using the memory 202. Furthermore, the digital signal processor 200 processes the digital input signals IN1(*f*) and IN2(*f*) so as to suppress the noises N1 and N2 transmitted from directions in the noise suppression angular range Rn, hereinafter merely referred to as a suppression range Rn. Still furthermore, the digital signal processor 200 converts a processed frequency-domain digital input signal INd(f), in which noises N1 and N2 have been suppressed, into a time-domain digital sound signal INd(t) by performing, for example, the inverse Fourier transform and outputs the digital sound signal INd(t) that has been subjected to noise suppression.

In this embodiment, the microphone array apparatus 100 may be applied to an information apparatus such as a car navigation apparatus having a speech recognition function. Accordingly, an arrival direction range of voice of a driver that is the target sound source SS or a minimum sound reception range may be determined in advance for the microphone array apparatus 100. When voice is transmitted from a direction near the voice arrival direction range, it may be determined that a target sound signal likelihood is high.

When it is determined that the target sound signal likelihood D(f) of the digital input signal IN1(*f*) or IN2(*f*) is high, the digital signal processor 200 sets a wide sound reception angular range Rs or a wide nonsuppression angular range, hereinafter merely referred to as a sound reception range or a nonsuppression range respectively, and a narrow suppression range Rn. The target sound signal likelihood may be, for example, a target speech signal likelihood. A noise likelihood is an antonym for a target sound likelihood. The target sound signal likelihood is hereinafter merely referred to as a target sound likelihood. On the basis of the set sound reception range Rs and the set suppression range Rn, the digital signal processor 200 processes both of the digital input signal IN1(*f*) and IN2(*f*). As a result, the digital sound signal INd(t) that has been moderately subjected to noise suppression in a narrow range is generated.

On the other hand, when it is determined that the target sound likelihood D(f) of the digital input signal IN1(*f*) or IN2(*f*) is low or the noise likelihood of the digital input signal IN1(*f*) or IN2(*f*) is high, the digital signal processor 200 sets a narrow sound reception range Rs and a wide suppression range Rn. On the basis of the set sound reception range Rs and the set suppression range Rn, the digital signal processor 200 processes both of the digital input signal IN1(*f*) and IN2(*f*). As a result, the digital sound signal INd(t) that has been sufficiently subjected to noise suppression in a wide range is generated.

In general, the digital input signal IN1(*f*) including sound, for example, human voice, of the target sound source SS has an absolute value larger than an average absolute value AV{|IN1(*f*)|} of a whole or wider period of the digital input signals IN1(*f*) or an amplitude larger than an average amplitude value AV{|IN1(*f*)|} of the whole or wider period of the digital input signals IN1(*f*), and the digital input signal IN1(*f*) corresponding to the noise N1 or N2 has an absolute value smaller than the average absolute value AV{|IN1(*f*)|} of the digital input signals IN1(*f*) or an amplitude smaller than the average amplitude value AV{|IN1(*f*)|} of the digital input signals IN1(*f*).

Immediately after noise suppression has started, it is not desirable that the average absolute value AV{|IN1(*f*)|} of the digital input signals IN1(*f*) or the average amplitude value AV{|IN1(*f*)|} of the digital input signals IN1(*f*) be used since a sound signal reception period is short. In this case, instead of the average value, a certain initial value may be used. When such an initial value is not set, noise suppression may be unstably performed until an appropriate average value is calculated and it may take some time to achieve stable noise suppression.

Accordingly, when the digital input signal IN1(*f*) has an absolute value larger than the average absolute value AV{|IN1(*f*)|} of the digital input signals IN1(*f*) or an amplitude larger than the average amplitude value AV{|IN1(*f*)|} of the digital input signals IN1(*f*), it may be estimated that the target sound likelihood D(f) of the digital input signal IN1(*f*) is high. On the other hand, when the digital input signal IN1(*f*) has an absolute value smaller than the average absolute value AV{|IN1(*f*)|} of the digital input signals IN1(*f*) or an amplitude smaller than the average amplitude value AV{|IN1(*f*)|} of the digital input signals IN1(*f*), it may be estimated that the target sound likelihood D(f) of the digital input signal IN1(*f*) is low and the noise likelihood of the digital input signal IN1(*f*) is high. The target sound likelihood D(f) may be, for example, $0 \leq D(f) \leq 1$. In this case, when $D(f) \geq 0.5$, the target sound likelihood of the digital input signal IN1(*f*) is high. When $D(f) < 0.5$, the target sound likelihood of the digital input signal IN1(*f*) is low and the noise likelihood of the digital input signal IN1(*f*) is high. Determination of the target sound likelihood D(f) may not be restricted to with the absolute value or amplitude of a digital input signal. Any value representing the absolute value or amplitude of a digital input signal, for example, the square of the absolute value of a digital input signal, the square of the amplitude of a digital input signal, or the power of a digital input signal, may be used.

As described previously, the digital signal processor 200 may be connected to the direction determiner 194 or the processor 10. In this case, the digital signal processor 200 sets the sound reception range Rs, the suppression range Rn, and a shift range Rt on the basis of information representing the minimum sound reception range Rsmin transmitted from the direction determiner 194 or the processor 10 and suppresses the noises N1 and N2 transmitted from suppression direction in the suppression range Rn and the shift range Rt. The minimum sound reception range Rsmin represents the minimum value of the sound reception range Rs in which sound is processed as the sound of the target sound source SS. The information resenting the minimum sound reception range Rsmin may be, for example, the minimum value $\theta tb_{min}$ of an angular boundary θtb between the sound reception range Rs and the suppression range Rn.

The direction determiner 194 or the processor 10 may generate information representing the minimum sound reception range Rsmin by processing a setting signal input by a user with a key. Furthermore, on the basis of detection data or image data obtained by the talker direction detection sensor 192, the direction determiner 194 or the processor 10 may detect or recognize the presence of a talker, determine a direction in which the talker is present, and generate information representing the minimum sound reception range Rsmin.

The output digital sound signal INd(t) is used for, for example, speech recognition or mobile telephone communication. The digital sound signal INd(t) is supplied to the utilization application 400 at the subsequent stage, is subjected to digital-to-analog conversion in a digital-to-analog converter 404, and is then subjected to low-pass filtering in a low-pass filter 406, so that an analog signal is generated. Alternatively, the digital sound signal INd(t) is stored in a memory 414 and is used for speech recognition in a speech recognizer 416. The speech recognizer 416 may be a processor that is installed as a piece of hardware or a processor that is installed as a piece of software for operating in accordance with a program stored in the memory 414 including, for example, a ROM and a RAM. The digital signal processor 200 may be a signal processing circuit that is installed as a piece of hardware or a signal processing circuit that is installed as a piece of software for operating in accordance with a program stored in the memory 202 including, for example, a ROM and a RAM.

Referring to FIG. 1, the microphone array apparatus 100 sets an angular range in the direction θ (=−π/2) of the target sound source SS, for example, an angular range of $-\pi/2 \le \theta < -\pi/12$, as the sound reception range Rs or the nonsuppression range Rs. Furthermore, the microphone array apparatus 100 may set an angular range in the main suppression direction θ=+π/2, for example, an angular range of $+\pi/12 < \theta \le +\pi/2$, as the suppression range Rn. Still furthermore, the microphone array apparatus 100 may set an angular range between the sound reception range Rs and the suppression range Rn, for example, an angular range of $-\pi/12 \le \theta \le +\pi/12$, as the shift (switching) angular range Rt (hereinafter merely referred to as the shift range Rt).

Figure 3A:
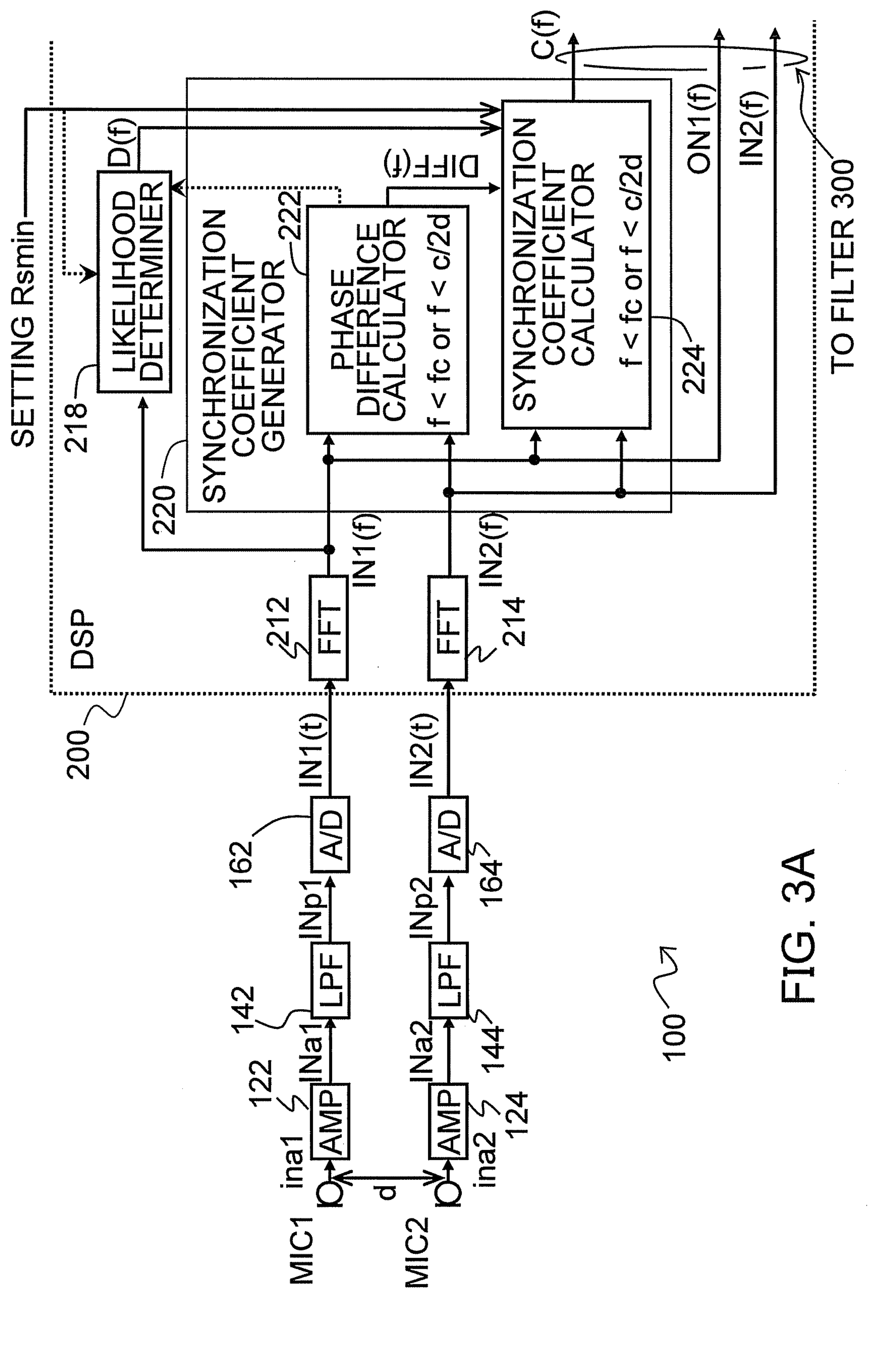
FIGS. 3A and 3B are schematic diagrams illustrating a configuration of the microphone array apparatus capable of relatively reducing noise by suppressing noise with the arrangement of the array of the microphones illustrated in FIG. 1.
Figure 3B:
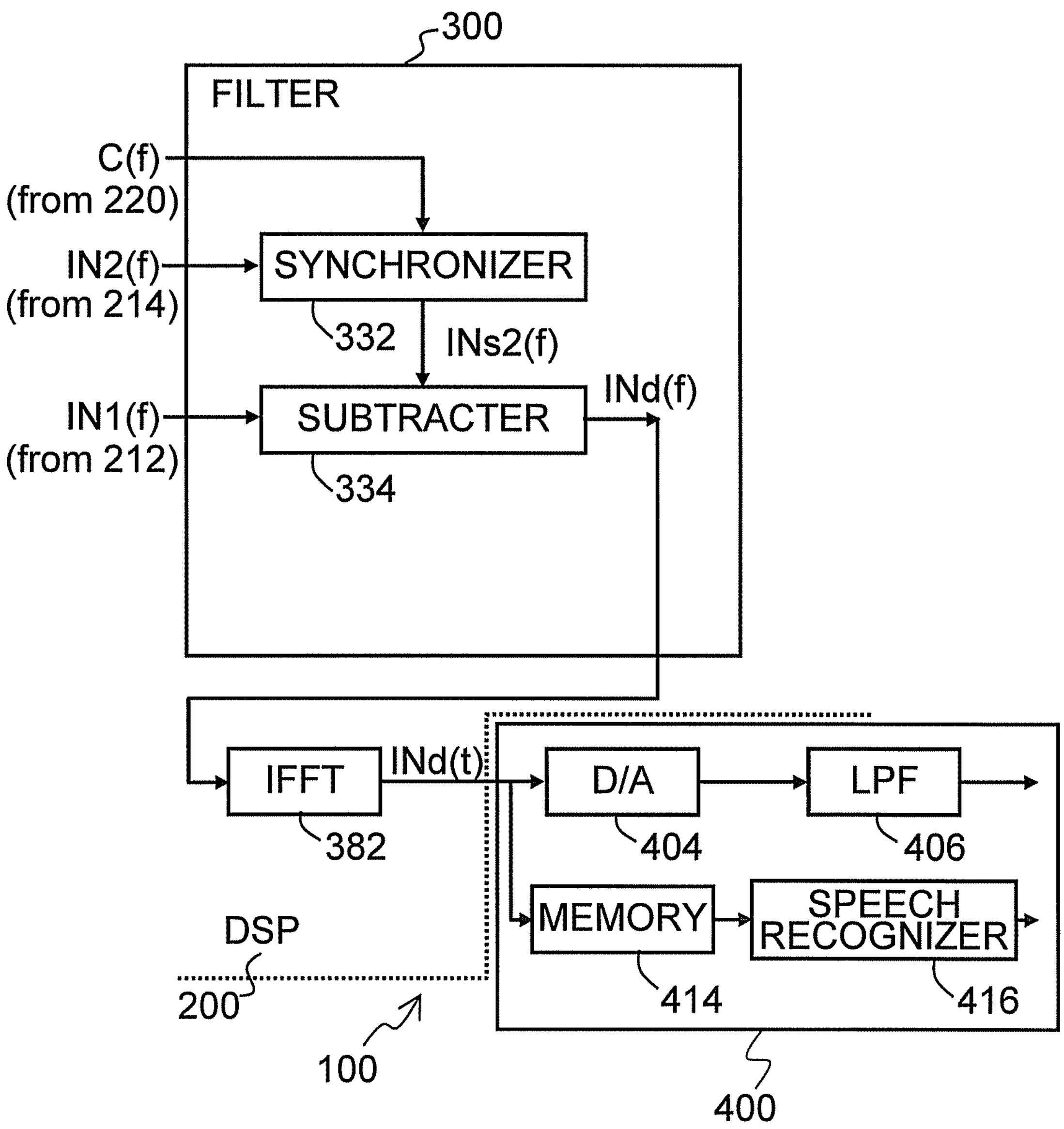

FIGS. 3A and 3B are schematic diagrams illustrating a configuration of the microphone array apparatus 100 capable of relatively reducing noise by suppressing noise with the arrangement of the array of the microphones MIC1 and MIC2 illustrated in FIG. 1. The digital signal processor 200 includes a fast Fourier transformer 212 connected to the output terminal of the analog-to-digital converter 162, a fast Fourier transformer 214 connected to the output terminal of the analog-to-digital converter 164, a target sound likelihood determiner 218, a synchronization coefficient generator 220, and a filter 300. In this embodiment, fast Fourier transform is performed for frequency conversion or orthogonal transformation. However, another function that may be used for frequency conversion (for example, discrete cosine transform, wavelet transform, or the like) may be used.

The synchronization coefficient generator 220 includes a phase difference calculator 222 for calculating the phase difference between complex spectrums of each frequency f ($0<f<fs/2$) in a certain frequency band, for example, an audible frequency band, and a synchronization coefficient calculator 224. The filter 300 includes a synchronizer 332 and a subtracter 334. Instead of the subtracter 334, a sign inverter for inverting an input value and an adder connected to the sign inverter may be used as an equivalent circuit. The target sound likelihood determiner 218 may be included in the synchronization coefficient generator 220.

The target sound likelihood determiner 218 connected to the output terminal of the fast Fourier transformer 212 generates the target sound likelihood D(f) on the basis of the absolute value or amplitude of the complex spectrum IN1(*f*) transmitted from the fast Fourier transformer 212 and supplies the target sound likelihood D(f) to the synchronization coefficient generator 220. The target sound likelihood D(f) is a value satisfying $0 \le D(f) \le 1$. When the target sound likelihood D(f) of the complex spectrum IN1(*f*) is the highest, the value of the target sound likelihood D(f) is one. When the target sound likelihood D(f) of the complex spectrum IN1(*f*) is the lowest or the noise likelihood of the complex spectrum IN1(*f*) is the highest, the value of the target sound likelihood D(f) is zero.

Figure 4A:
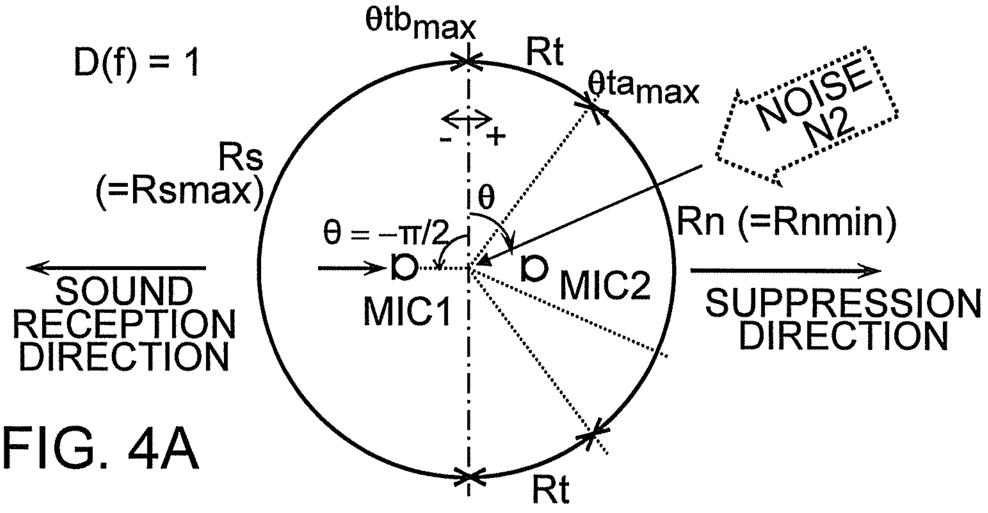
FIGS. 4A and 4B are diagrams illustrating an exemplary setting state of a sound reception range, a suppression range, and a shift range when a target sound likelihood is the highest and the lowest, respectively.
Figure 4B:
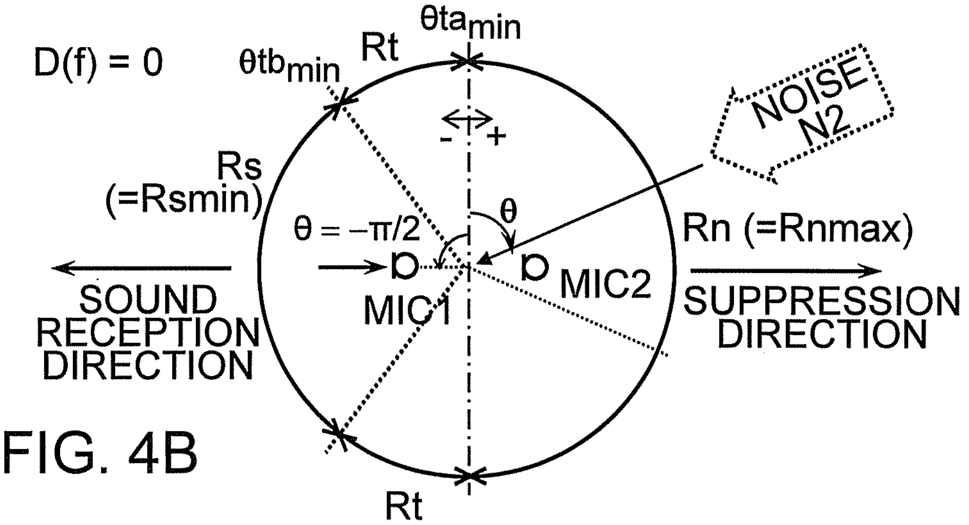

FIG. 4A is a diagram illustrating an exemplary setting state of the sound reception range Rs, the suppression range Rn, and the shift range Rt when the target sound likelihood D(f) is the highest. FIG. 4B is a diagram illustrating an exemplary setting state of the sound reception range Rs, the suppression range Rn, and the shift range Rt when the target sound likelihood D(f) is the lowest.

When the target sound likelihood D(f) is the highest (=1), the synchronization coefficient calculator 224 sets the sound reception range Rs to the maximum sound reception range Rsmax, the suppression range Rn to the minimum suppression range Rnmin, and the shift range Rt between the maximum, sound reception range Rsmax and the minimum suppression range Rnmin as illustrated in FIG. 4A so as to calculate a synchronization coefficient to be described later. The maximum sound reception range Rsmax is set in the range of the angle θ satisfying, for example, $-\pi/2 \le \theta < 0$. The minimum suppression range Rnmin is set in the range of the angle θ satisfying, for example, $+\pi/6 < \theta \le +\pi/2$. The shift range Rt is set in the range of the angle θ satisfying, for example, $0 \le \theta \le +\pi/6$.

When the target sound likelihood D(f) is the lowest (=0), the synchronization coefficient calculator 224 sets the sound reception range Rs to the minimum sound reception range Rsmin, the suppression range Rn to the maximum suppression range Rnmax, and the shift range Rt between the minimum sound reception range Rsmin and the maximum suppression range Rnmax as illustrated in FIG. 4B. The minimum sound reception range Rsmin is set in the range of the angle θ satisfying, for example, $-\pi/2 \le \theta < -\pi/6$. The maximum suppression range Rnmax is set in the range of the angle θ satisfying, for example, $0 < \theta \le +\pi/2$. The shift range Rt is set in the range of the angle θ satisfying, for example, $-\pi/6 \le \theta \le 0$.

When the target sound likelihood D(f) is a value between the maximum value and the minimum value ($0<D(f)<1$), as illustrated in FIG. 1, the synchronization coefficient calculator 224 sets the sound reception range Rs and the suppression range Rn on the basis of the value of the target sound likelihood D(f) and sets the shift range Rt between the sound reception range Rs and the suppression range Rn. In this case, the larger the value of the target sound likelihood D(f), the larger the sound reception range Rs in proportion to D(f) and the smaller the suppression range Rn. For example, when the target sound likelihood D(f) is 0.5, the sound reception range Rs is set in the range of the angle θ satisfying, for example, $-\pi/2 \le \theta < -\pi/12$, the suppression range Rn is set in the range of the angle θ satisfying, for example, $+\pi/12 < \theta \le +\pi/2$, and the shift range Rt is set in the range of the angle θ satisfying, for example, $-\pi/12 \le \theta \le +\pi/12$.

The target sound likelihood determiner 218 may sequentially calculate time average values AV{|IN1(*f*)|} of absolute values |IN1 (*f,i*)| of complex spectrums IN1(*f*) for each time analysis frame (window) i in fast Fourier transform, where i represents the time sequence number (0, 1, 2, . . . ) of an analysis frame. When the sequence number i is an initial sequence number i=0, AV{|IN1 (*f,i*)|}=|IN1 (*f,i*)|. When the sequence number i>0, AV{|IN1 (*f,i*)|}=βAV{|IN1 (f,i−1)|}+(1−β)|IN1 (*f,i*)|. β for the calculation of the average value AV{|IN1(*f*)|} is a value representing the weight ratio of the average value AV{|IN1 (f,i−1)|} of the last analysis frame and the average value AV{|IN1 (*f,i*)|} of a current analysis frame, and is set in advance so that 0≤β<1 is satisfied. For the first several sequence numbers i=0 to m (m is an integer equal to or larger than one), a fixed value INc=AV{|IN1(*f,i*)|} may be used. The fixed value INc may be empirically determined.

The target sound likelihood determiner 218 calculates a relative level γ to an average value by dividing the absolute value of the complex spectrum IN1(*f*) by the time average value of the absolute values as represented by the following equation:

$$\gamma = |IN1(f,i)| / AV\{|IN1(f,i)|\}.$$

The target sound likelihood determiner 218 determines the target sound likelihood D(f) of the complex spectrum IN1(*f*) in accordance with the relative level γ. Alternatively, instead of the absolute value |IN1(*f,i*)| of the complex spectrum IN1(*f*), the square of the absolute value, $|IN1(f,i)|^2$ may be used.

Figure 5:
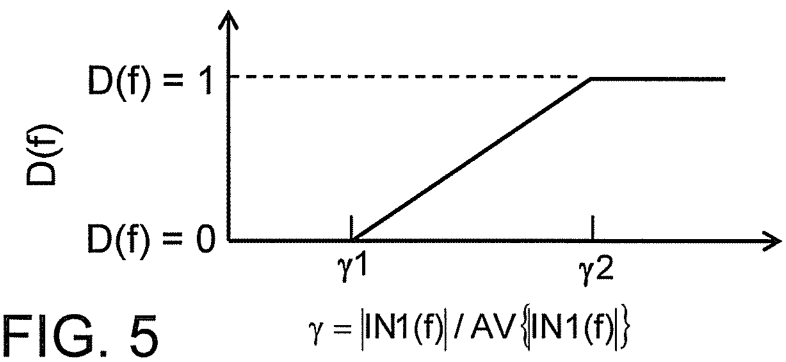
FIG. 5 is a diagram illustrating an exemplary case in which the value of a target sound likelihood is determined in accordance with the level of a digital input signal.

FIG. 5 is a diagram illustrating an exemplary case in which the value of the target sound likelihood D(f) is determined in accordance with the relative level γ of a digital input signal. For example, when the relative level γ of the absolute value of the complex spectrum IN1(*f*) is equal to or smaller than a certain threshold value γ1 (for example, γ1=0.7), the target sound likelihood determiner 218 sets the target sound likelihood D(f) to zero. For example, when the relative level γ of the absolute value of the complex spectrum IN1(*f*) is equal to or larger than another threshold value γ2 (>γ1) (for example, γ2=1.4), the target sound likelihood determiner 218 sets the target sound likelihood D(f) to one. For example, when the relative level γ of the absolute value of the complex spectrum IN1(*f*) is a value between the two threshold values γ1 and γ2 (γ1<γ<γ2), the target sound likelihood determiner 218 sets the target sound likelihood D(f) to (γ−γ1)/(γ2−γ1) by proportional distribution. The relationship between the relative level γ and the target sound likelihood D(f) is not limited to that illustrated in FIG. 5, and may be the relationship in which the target sound likelihood D(f) monotonously increases in accordance with the increase in the relative level γ, for example, a sigmoid function.

Figure 10:
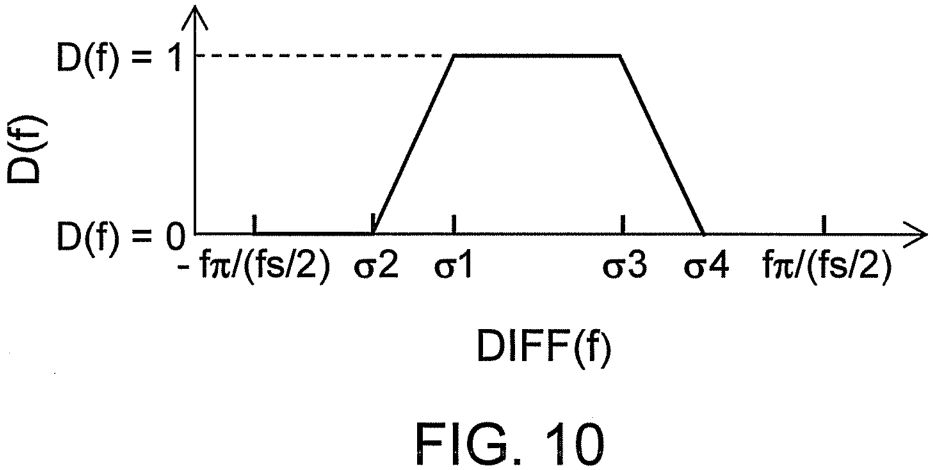
FIG. 10 is a diagram illustrating another exemplary case in which the value of a target sound likelihood is determined in accordance with the level of a digital input signal.

FIG. 10 is a diagram illustrating another exemplary case in which the value of the target sound likelihood D(f) is determined in accordance with the relative level γ of a digital input signal. Referring to FIG. 10, on the basis of a phase spectrum difference DIFF(f) representing a sound source direction, the value of the target sound likelihood D(f) is determined. Here, the closer the phase spectrum difference DIFF(f) representing a sound source direction is to a talker direction predicted with, for example, a car navigation application, the higher the target sound likelihood D(f). Threshold values σ1 to σ4 are set on the basis of a predicted talker direction. When a target sound source is in the line connecting microphones as illustrated in FIG. 1, for example, σ1=−0.2fπ/(fs/2), σ2=−0.4fπ/(fs/2), σ3=0.2fπ (fs/2), and σ4=0.4 fπ (fs/2) are set.

Referring to FIGS. 1, 4A, and 4B, when the target sound likelihood D(f) output from the target sound likelihood determiner 218 is 0<D(f)<1, the synchronization coefficient calculator 224 sets the sound reception range Rs, the suppression range Rn, and the shift range Rt as illustrated in FIG. 1. When the target sound likelihood D(f) output from the target sound likelihood determiner 218 is D(f)=1, the synchronization coefficient calculator 224 sets the maximum sound reception range Rsmax, the minimum suppression range Rnmin, and the shift range Rt as illustrated in FIG. 4A. When the target sound likelihood D(f) output from the target sound likelihood determiner 218 is D(f)=0, the synchronization coefficient calculator 224 sets the minimum sound reception range Rsmin, the maximum suppression range Rnmax, and the shift range Rt as illustrated in FIG. 4B.

An angular boundary θta between the shift range Rt and the suppression range Rn is a value satisfying $\theta ta_{min} \le \theta ta \le \theta ta_{max}$. Here, $\theta ta_{min}$ is the minimum value of θta, and is, for example, zero radian. $\theta ta_{max}$ is the maximum value of θta, and is, for example, +π/6. The angular boundary θta is represented for the target sound likelihood D (f) by proportional distribution as follows:

$$\theta ta = \theta ta_{min} + (\theta ta_{max} - \theta ta_{min}) D(f).$$

An angular boundary θtb between the shift range Rt and the sound reception range Rs is a value satisfying θta>θtb and $\theta tb_{min} \le \theta tb \le \theta tb_{max}$. Here, $\theta tb_{min}$ is the minimum value of θtb, and is, for example, −π/6. $\theta tb_{max}$ is the maximum value of θtb, and is, for example, zero radian. The angular boundary θtb is represented for the target sound likelihood D (f) by proportional distribution as follows:

$$\theta tb = \theta tb_{min} + (\theta tb_{max} - \theta tb_{min}) D(f).$$

The time-domain digital input signals IN1(*t*) and IN2(*t*) output from the analog-to-digital converters 162 and 164 are supplied to the fast Fourier transformers 212 and 214, respectively. The fast Fourier transformers 212 and 214 perform Fourier transform or orthogonal transformation upon the product of the signal section of the digital input signal IN1(*t*) and an overlapping window function and the product of the signal section of the digital input signal IN2(*t*) and an overlapping window function, thereby generating the frequency-domain complex spectrums IN1(*f*) and IN2(*f*), respectively. Here, the frequency-domain complex spectrum IN1(*f*) is $IN1(f) = A_1 e^{j(2\pi ft + \phi 1(f))}$, the frequency-domain complex spectrum IN2(*f*) is $IN2(f) = A_2 e^{j(2\pi ft + \phi 2(f))}$, where f represents a frequency, $A_1$ and $A_2$ represent an amplitude, j represents an imaginary unit, and φ1(*f*) and φ2(*f*) represent a phase lag that is a function for the frequency f. As an overlapping window function, for example, a hamming window function, a hanning window function, a Blackman window function, a three sigma gauss window function, or a triangle window function may be used.

The phase difference calculator 222 calculates as follows a phase difference DIFF(f) in radian for each frequency f (0<f<fs/2) between phase spectrum components of the two adjacent microphones MIC1 and MIC2 that are spaced the distance d apart from each other. The phase difference DIFF(f) represents a sound source direction for each of the frequencies. The phase DIFF(f) is expressed in the following equation under the assumption that there is only one sound source corresponding to a specific frequency:

$$DIFF(f)=\tan^{-1}(J\{IN2(f)/IN1(f)\}/R\{IN2(f)/IN1(f)\}),$$

where J{x} represents the imaginary component of a complex number x, and R{x} represents the real component of the complex number x. When the phase difference DIFF(f) is represented with the phase lags ($\phi 1(f)$ and $\phi 2(f)$) of the digital input signals IN1(t) and IN2(t), the following equation is obtained.

$$\begin{aligned} DIFF(f) &= \tan^{-1}\left(\frac{J\{(A_2 e^{j(2\pi ft+\phi 2(f))}/A_1 e^{j(2\pi ft+\phi 1(f))}\}}{R\{(A_2 e^{j(2\pi ft+\phi 2(f))}/A_1 e^{j(2\pi ft+\phi 1(f))}\}}\right) \\ &= \tan^{-1}(J\{(A_2/A_1)e^{j(\phi 2(f)-\phi 1(f))}\}/R\{(A_2/A_1)e^{j(\phi 2(f)-\phi 1(f))}\}) \\ &= \tan^{-1}(J\{e^{j(\phi 2(f)-\phi 1(f))}\}/R\{e^{j(\phi 2(f)-\phi 1(f))}\}) \\ &= \tan^{-1}(\sin(\phi 2(f)-\phi 1(f))/\cos(\phi 2(f)-\phi 1(f))) \\ &= \tan^{-1}(\tan(\phi 2(f)-\phi 1(f)) \\ &= \phi 2(f)-\phi 1(f) \end{aligned}$$

The phase difference calculator 222 supplies to the synchronization coefficient calculator 224 the phase difference DIFF(f) for each frequency f between phase spectrum components of the two adjacent input signals IN1(f) and IN2(f).

Figure 6A:
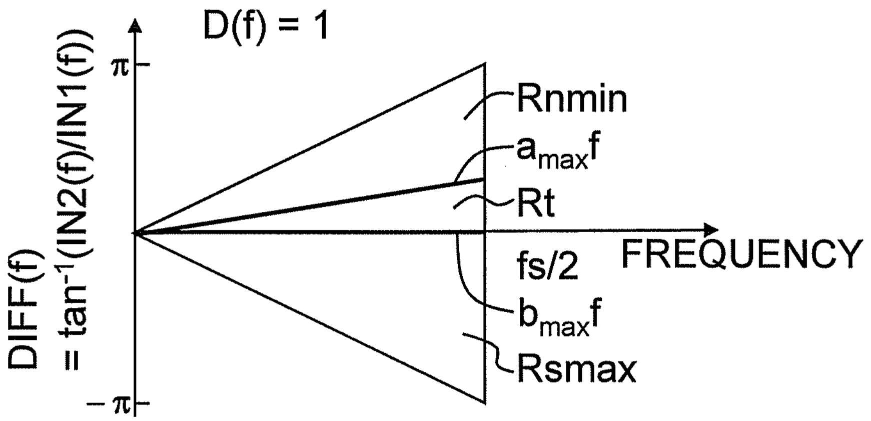
FIGS. 6A to 6C are diagrams illustrating the relationships between a phase difference for each frequency between phase spectrum components calculated by a phase difference calculator and each of a sound reception range, a suppression range, and a shift range which are obtained at different target sound likelihoods when microphones are arranged as illustrated in FIG. 1.
Figure 6B:
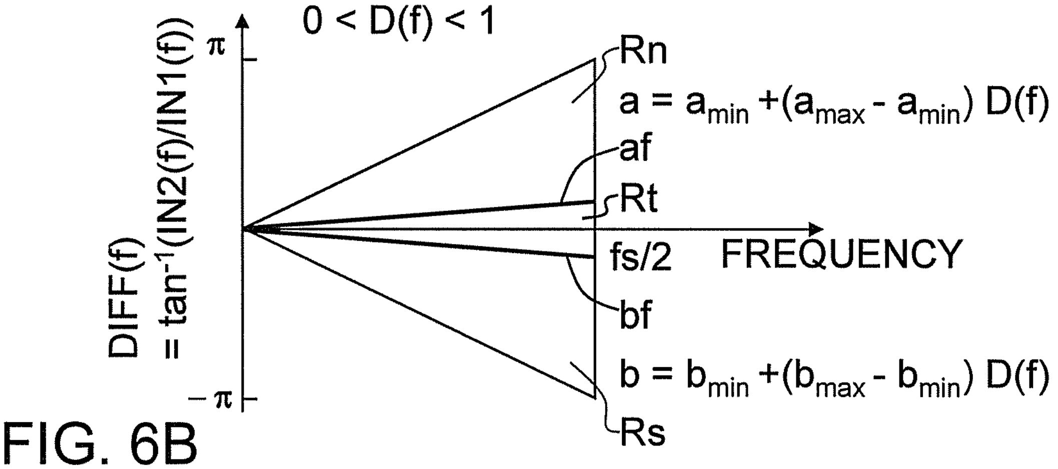
Figure 6C:
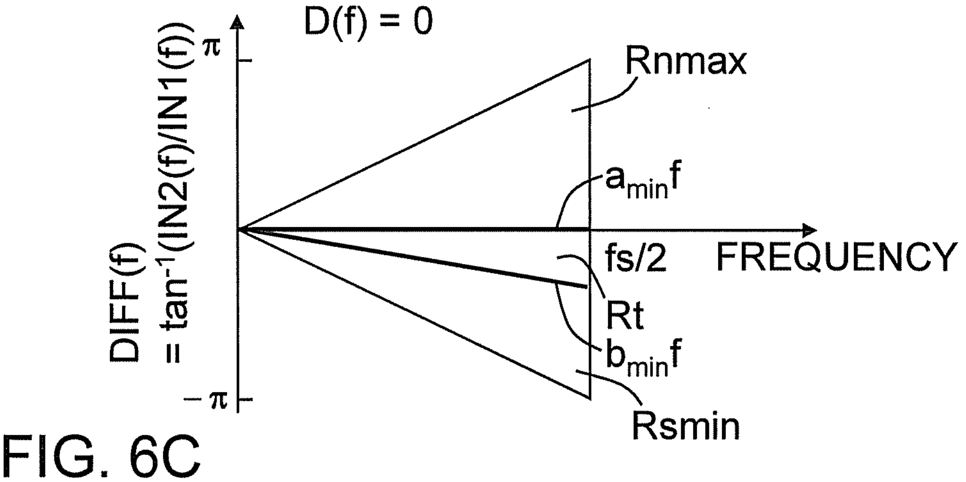

FIGS. 6A to 6C are diagrams illustrating the relationships between the phase difference DIFF(f) for each frequency f calculated by the phase difference calculator 222 and each of the sound reception range Rs, the suppression range Rn, and the shift range Rt which are obtained at different target sound likelihoods D(f) when the microphones MIC1 and MIC2 are arranged as illustrated in FIG. 1.

Referring to FIGS. 6A to 6C, a linear function af represents a boundary of the phase difference DIFF(f) corresponding to the angular boundary Ota between the suppression range Rn and the shift range Rt. Here, the frequency f is a value satisfying 0<f<fs/2, a represents the coefficient of the frequency f, and the coefficient a has a value between the minimum value $a_{min}$ and the maximum value $a_{max}$, that is $-2\pi/fs<a_{min}\leq a\leq a_{max}<+2\pi/fs$. A linear function bf represents a boundary of the phase difference DIFF(f) corresponding to the angular boundary θtb between the sound reception range Rs and the shift range Rt. Here, b represents the coefficient of the frequency f, and the coefficient b is a value between the minimum value $b_{min}$ and the maximum value $b_{max}$, that is $-2\pi/fs<b_{min}\leq b\leq b_{max}<+2\pi/fs$. The relationship between the coefficients a and b is a>b.

A function $a_{max}f$ illustrated in FIG. 6A corresponds to the angular boundary $\theta ta_{max}$ illustrated in FIG. 4A. A function $a_{min}f$ illustrated in FIG. 6C corresponds to the angular boundary $\theta ta_{min}$ illustrated in FIG. 4B. A function $b_{max}f$ illustrated in FIG. 6A corresponds to the angular boundary $\theta tb_{max}$ illustrated in FIG. 4A. A function $b_{min}f$ illustrated in FIG. 6C corresponds to the angular boundary $\theta tb_{min}$ illustrated in FIG. 4B.

Referring to FIG. 6A, when the target sound likelihood D(f) is the highest, D(f)=1, the maximum sound reception range Rsmax corresponds to the maximum phase difference range of $-2\pi f/fs\leq DIFF(f)<b_{max}f$. In this case, the minimum suppression range Rnmin corresponds to the minimum phase difference range of $a_{max}f<DIFF(f)\leq+2\pi f/fs$, and the shift range Rt corresponds to the phase difference range of $b_{max}f\leq DIFF(f)\leq a_{max}f$. For example, the maximum value of the coefficient a is $a_{max}=+2\pi/3fs$, and the maximum value of the coefficient b is $b_{max}=0$.

Referring to FIG. 6C, when the target sound likelihood D(f) is the lowest, D(f)=0, the minimum sound reception range Rsmin corresponds to the minimum phase difference range of $-2\pi f/fs\leq DIFF(f)<b_{min}f$. In this case, the maximum suppression range Rnmax corresponds to the maximum phase difference range of $a_{min}f<DIFF(f)\leq+2\pi f/fs$, and the shift range Rt corresponds to the phase difference range of $b_{min}f\leq DIFF(f)\leq a_{min}f$. For example, the minimum value of the coefficient a is $a_{min}=0$, and the minimum value of the coefficient b is $b_{min}=-2\pi/3fs$.

Referring to FIG. 6B, when the target sound likelihood D(f) is a value between the maximum value and the minimum value, 0<D(f)<1, the sound reception range Rs corresponds to the intermediate phase difference range of $-2\pi f/fs\leq DIFF(f)<bf$. In this case, the suppression range Rn corresponds to the intermediate phase difference range of $af<DIFF(f)\leq+2\pi f/fs$, and the shift range Rt corresponds to the phase difference range of $bf\leq DIFF(f)\leq af$.

The coefficient a of the frequency f is represented for the target sound likelihood D(f) by proportional distribution as follows:

$$a=a_{min}+(a_{max}-a_{min})D(f).$$

The coefficient b of the frequency f is represented for the target sound likelihood D(f) by proportional distribution as follows:

$$b=b_{min}+(b_{max}-b_{min})D(f).$$

Referring to FIGS. 6A to 6C, when the phase difference DIFF(f) is in a range corresponding to the suppression range Rn, the synchronization coefficient calculator 224 performs noise suppression processing upon the digital input signals IN1(f) and IN2(f). When the phase difference DIFF(f) is in a range corresponding to the shift range Rt, the synchronization coefficient calculator 224 performs noise suppression processing upon the digital input signals IN1(f) and IN2(f) in accordance with the frequency f and the phase difference DIFF(f). When the phase difference DIFF(f) is in a range corresponding to the sound reception range Rs, the synchronization coefficient calculator 224 does not perform noise suppression processing upon the digital input signals IN1(f) and IN2(f).

The synchronization coefficient calculator 224 calculates that noise transmitted from the direction of the angle θ, for example $+\pi/12<\theta\leq+\pi/2$, in the suppression range Rn reaches the microphone MIC2 earlier and reaches the microphone MIC1 later with a delay time corresponding to the phase difference DIFF(f) at a specific frequency f. Furthermore, the synchronization coefficient calculator 224 gradually switches between processing in the sound reception range Rs and noise suppression processing in the suppression range Rn in the range of the angle θ, for example $-\pi/12\leq\theta\leq+\pi/12$, in the shift range Rt at the position of the microphone MIC1.

The synchronization coefficient calculator 224 calculates a synchronization coefficient C(f) on the basis of the phase difference DIFF(f) for each frequency f between phase spectrum components using the following equations.

(a) The synchronization coefficient calculator 224 sequentially calculates the synchronization coefficients C(f) for time analysis frames (windows) i in fast Fourier transform. Here, i represents the time sequence number 0, 1, 2, of an analysis frame. A synchronization coefficient C(f,i)=Cn(f,i) when the phase difference DIFF(f) is a value corresponding to the angle θ, for example $+\pi/12<\theta\leq+\pi/2$, in the suppression range Rn is calculated as follows:

$$C(f,0)=Cn(f,0)=IN1(f,0)/IN2(f,0), \text{where } i=0, \text{and}$$

$$C(f,i)=Cn(f,i)=\alpha C(f,i-1)+(1-\alpha)IN1(f,i)/IN2(f,i), \text{where } i>0.$$

Here, IN1$(f,i)$/IN2$(f,i)$ represents the ratio of the complex spectrum of a signal input into the microphone MIC1 to the complex spectrum of a signal input into the microphone MIC2, that is, represents an amplitude ratio and a phase difference. It may be considered that IN1$(f,i)$/IN2$(f,i)$ represents the inverse of the ratio of the complex spectrum of a signal input into the microphone MIC2 to the complex spectrum of a signal input into the microphone MIC1. Furthermore, $\alpha$ represents the synchronization addition ratio or synchronization synthesis ratio of the amount of phase lag of the last analysis frame and is a constant satisfying $0\leq\alpha<1$, and $1-\alpha$ represents the synchronization addition ratio or synchronization synthesis ratio of the amount of phase lag of a current analysis frame. A current synchronization coefficient C(f,i) is obtained by adding the synchronization coefficient of the last analysis frame and the ratio of the complex spectrum of a signal input into the microphone MIC1 to the complex spectrum of a signal input into the microphone MIC2 in the current analysis frame at a ratio of $\alpha:(1-\alpha)$.

(b) A synchronization coefficient C(f)=Cs(f) when the phase difference DIFF(f) is a value corresponding to the angle $\theta$, for example $-\pi/2\leq\theta<-\pi/12$, in the sound reception range Rs is calculated as follows:

$$C(f)=Cs(f)=\exp(-j2\pi f/fs) \text{or}$$

$$C(f)=Cs(f)=0 \text{(when synchronization subtraction is not performed).}$$

(c) A synchronization coefficient C(f)=Ct(f) when the phase difference DIFF(f) is a value corresponding to the angle $\theta$, for example $-\pi/12\leq\theta\leq+\pi/12$, in the shift range Rt is obtained by calculating the weighted average of Cs(f) and Cn(f) described in (a) in accordance with the angle $\theta$ as follows:

$$C(f)=Ct(f)=Cs(f)\times(\theta-\theta tb)/(\theta ta-\theta tb)+Cn(f)\times(\theta ta-\theta)/(\theta ta-\theta tb).$$

Here, $\theta$ta represents the angle of the boundary between the shift range Rt and the suppression range Rn, and $\theta$tb represents the angle of the boundary between the shift range Rt and the sound reception range Rs.

Thus, the synchronization coefficient generator 220 generates the synchronization coefficient C(f) in accordance with the complex spectrums IN1$(f)$ and IN2$(f)$ and supplies the complex spectrums IN1$(f)$ and IN2$(f)$ and the synchronization coefficient C(f) to the filter 300.

Referring to FIG. 3B, the synchronizer 332 included in the filter 300 synchronizes the complex spectrum IN2$(f)$ to the complex spectrum IN1$(f)$ by performing the following equation to generate a synchronized spectrum INs2$(f)$:

$$INs2(f)=C(f)\times IN2(f).$$

The subtracter 334 subtracts the product of a coefficient $\delta$(f) and the complex spectrum INs2$(f)$ from the complex spectrum IN1$(f)$ to generate a complex spectrum INd(f) with suppressed noise by the use of the following equation:

$$INd(f)=IN1(f)-\delta(f)\times INs2(f).$$

Here, the coefficient $\delta$(f) is set in advance and is a value satisfying $0\leq\delta(f)\leq1$. The coefficient $\delta$(f) is a function of the frequency f and is used to adjust the degree of subtraction of the spectrum INs2$(f)$ that is dependent on a synchronization coefficient. For example, in order to prevent the occurrence of a distortion of a sound signal representing sound transmitted from the sound reception range Rs and significantly suppress noise representing sound transmitted from the suppression range Rn, the coefficient $\delta$(f) may be set so that a sound arrival direction represented by the phase difference DIFF(f) has a value in the suppression range Rn larger than that in the sound reception range Rs.

The digital signal processor 200 further includes an inverse fast Fourier transformer (IFFT) 382. The inverse fast Fourier transformer 382 receives the spectrum INd(f) from the subtracter 334 and performs inverse Fourier transform and overlapping addition upon the spectrum INd(f), thereby generating the time-domain digital sound signal INd(t) at the position of the microphone MIC1.

The output of the inverse fast Fourier transformer 382 is input into the utilization application 400 at the subsequent stage.

The output digital sound signal INd(t) is used for, for example, speech recognition or mobile telephone communication. The digital sound signal INd(t) supplied to the utilization application 400 at the subsequent stage is subjected to digital-to-analog conversion in the digital-to-analog converter 404 and low-pass filtering in the low-pass filter 406, so that an analog signal is generated. Alternatively, the digital sound signal INd(t) is stored in the memory 414 and is used for speech recognition in the speech recognizer 416.

The components 212, 214, 218, 220 to 224, 300 to 334, and 382 illustrated in FIGS. 3A and 3B may be installed as an integrated circuit or may be processed by the digital signal processor 200 which may execute a program corresponding to the functions of these components.

Figure 7:
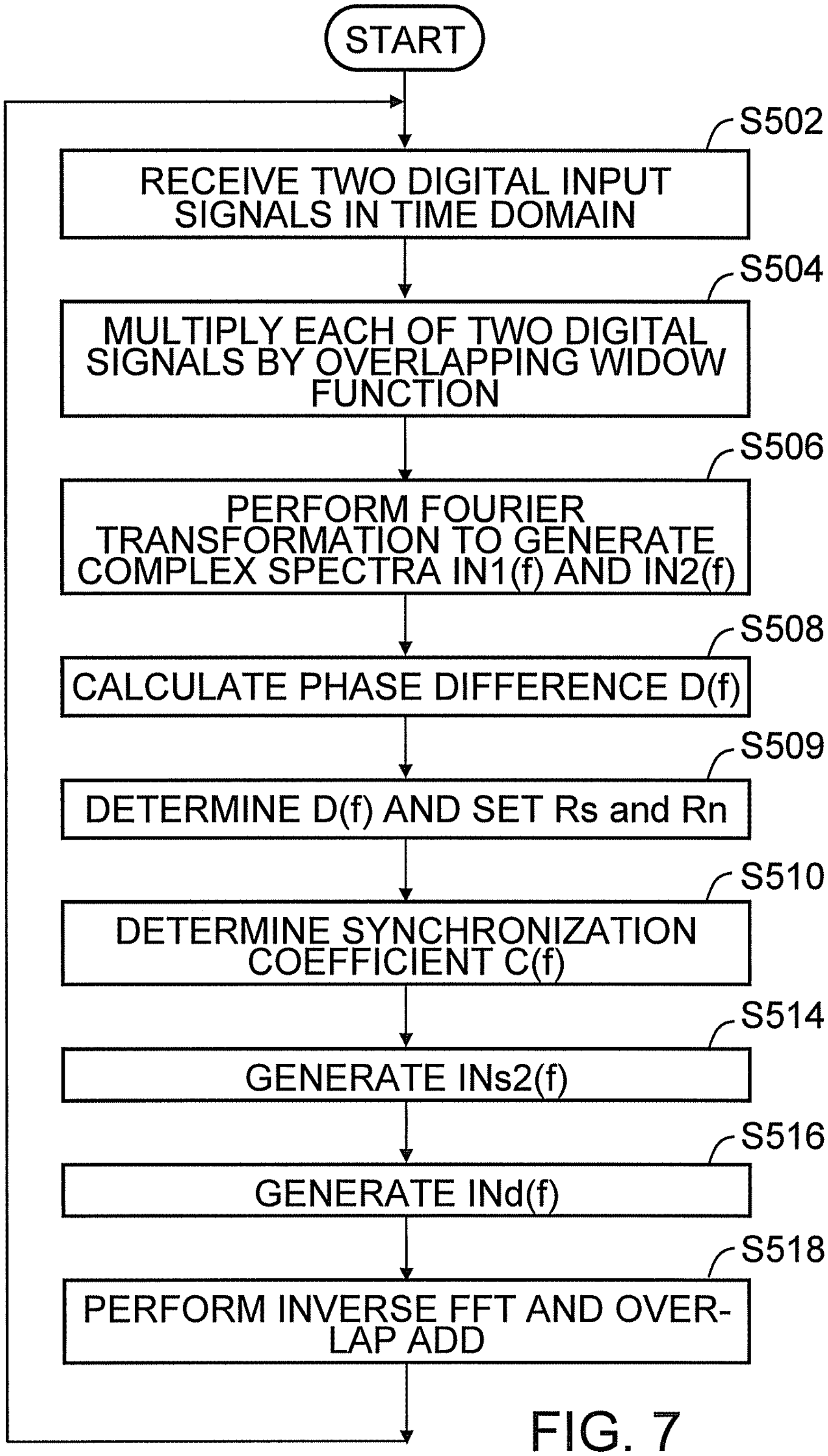
FIG. 7 is a flowchart illustrating a complex spectrum generation process performed by a digital signal processor (DSP) illustrated in FIG. 3A in accordance with a program stored in a memory.

FIG. 7 is a flowchart illustrating a complex spectrum generation process performed by the digital signal processor 200 illustrated in FIGS. 3A and 3B in accordance with a program stored in the memory 202. The complex spectrum generation process corresponds to functions achieved by the components 212, 214, 218, 220, 300, and 382 illustrated in FIGS. 3A and 3B.

Referring to FIGS. 3A, 3B, and 7, in S502, the digital signal processor 200 (the fast Fourier transformers 212 and 214) receives the two time-domain digital input signals IN1$(t)$ and IN2$(t)$ from the analog-to-digital converters 162 and 164, respectively.

In S504, the digital signal processor 200 (the fast Fourier transformers 212 and 214) multiplies each of the two digital input signals IN1$(t)$ and IN2$(t)$ by an overlapping window function.

In S506, the digital signal processor 200 (the fast Fourier transformers 212 and 214) performs Fourier transform upon the digital input signals IN1$(t)$ and IN2$(t)$ so as to generate the frequency-domain complex spectrums IN1$(f)$ and IN2$(f)$ from the digital input signals IN1$(t)$ and IN2$(t)$, respectively.

In S508, the digital signal processor 200 (the phase difference calculator 222 included in the synchronization coefficient generator 220) calculates the phase difference DIFF(f) between the complex spectrums IN1$(f)$ and IN2$(f)$ as follows: $DIFF(f)=\tan^{-1}(J\{IN2(f)/IN1(f)\}/R\{IN2(f)/IN1(f)\})$.

In S509, the digital signal processor 200 (the target sound likelihood determiner 218) generates the target sound likelihood D(f) ($0\leq D(f)\leq1$) on the basis of the absolute value or amplitude of the complex spectrum IN1$(f)$ transmitted from the fast Fourier transformer 212 and supplies the target sound likelihood D(f) to the synchronization coefficient generator 220. The digital signal processor 200 (the synchronization coefficient calculator 224 included in the synchronization coefficient generator 220) sets for each frequency f the sound reception range Rs ($-2\pi f/fs\leq DIFF(f)<bf$), the suppression range Rn ($af<DIFF(f)\leq+2\pi f/fs$), and the shift range Rt (bf≤DIFF(f)≤af) on the basis of the target sound likelihood D(f) and information representing the minimum sound reception range Rsmin.

In S510, the digital signal processor 200 (the synchronization coefficient calculator 224 included in the synchronization coefficient generator 220) calculates the ratio C(f) of the complex spectrum of a signal input into the microphone MIC1 to the complex spectrum of a signal input into the microphone MIC2 on the basis of the phase difference DIFF (f) as described previously using the following equation.

(a) When the phase difference DIFF(f) is a value corresponding to an angle θ in the suppression range Rn, the synchronization coefficient C(f) is calculated as follows: $C(f,i)=Cn(f,i)=\alpha C(f,i-1)+(1-\alpha)IN1(f,i)/IN2(f,i)$. (b) When the phase difference DIFF(f) is a value corresponding to an angle θ in the sound reception range Rs, the synchronization coefficient C(f) is calculated as follows: $C(f)=Cs(f)=\exp(-j2\pi f/fs)$ or $C(f)=Cs(f)=0$. (c) When the phase difference DIFF(f) is a value corresponding to an angle θ in the shift range Rt, the synchronization coefficient C(f) is calculated as follows: C(f)=Ct(f)=the weighted average of Cs(f) and Cn(f).

In S514, the digital signal processor 200 (the synchronizer 332 included in the filter 300) synchronizes the complex spectrum IN2(*f*) to the complex spectrum IN1(*f*) and generates the synchronized spectrum INs2(*f*) as follows: $INs2(f)=C(f)IN2(f)$.

In S516, the digital signal processor 200 (the subtracter 334 included in the filter 300) subtracts the product of the coefficient δ(f) and the complex spectrum INs2(*f*) from the complex spectrum IN1(*f*) ($INd(f)=IN1(f)-\delta(f)\times INs2(f)$) and generates the complex spectrum INd(f) with suppressed noise.

In S518, the digital signal processor 200 (the inverse fast Fourier transformer 382) receives the complex spectrum INd (f) from the subtracter 334, performs inverse Fourier transform and overlapping addition upon the complex spectrum INd(f), and generates the time-domain digital sound signal INd(t) at the position of the microphone MIC1.

Subsequently, the process returns to S502. The process from S502 to S518 is repeated during a certain period of time required for processing of input data.

Thus, according to the above-described embodiment, it is possible to process signals input into the microphones MIC1 and MIC2 in the frequency domain and relatively reduce noise included in these input signals. As compared with a case in which input signals are processed in a time domain, in the above-described case in which input signals are processed in a frequency domain, it is possible to more accurately detect a phase difference and generate a higher-quality sound signal with reduced noise. Furthermore, it is possible to generate a sound signal with sufficiently suppressed noise using signals received from a small number of microphones. The above-described processing performed upon signals received from two microphones may be applied to any combination of two microphones included in a plurality of microphones (FIG. 1).

When certain recorded sound data including background noise is processed, a suppression gain of approximately 3 dB is usually obtained. According to the above-described embodiment, it is possible to obtain a suppression gain of approximately 10 dB or more.

Figure 8A:
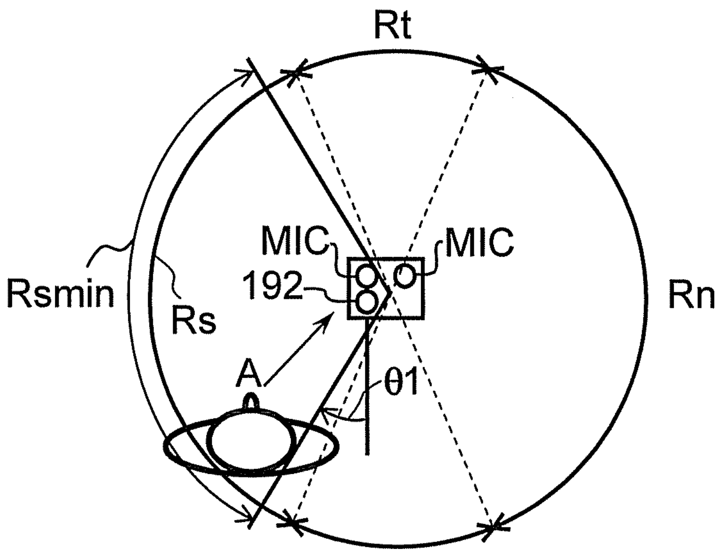
FIGS. 8A and 8B are diagrams illustrating the states of setting of a sound reception range, a suppression range, and a shift range which is performed on the basis of data obtained by a sensor or key input data.
Figure 8B:
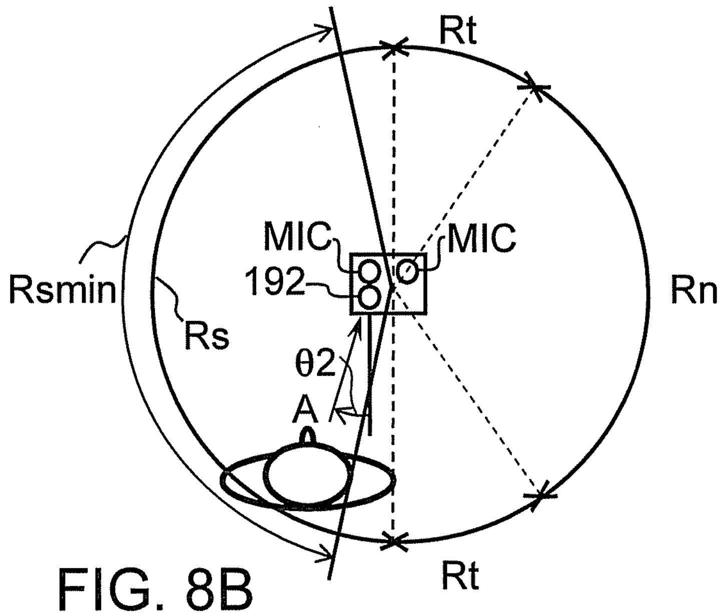

FIGS. 8A and 8B are diagrams illustrating the states of setting of the minimum sound reception range Rsmin which is performed on the basis of data obtained by the talker direction detection sensor 192 or data input with a key. The talker direction detection sensor 192 detects the position of a talker's body. The direction determiner 194 sets the minimum sound reception range Rsmin on the basis of the detected position so that the minimum sound reception range Rsmin covers the talker's body. Setting information is supplied to the synchronization coefficient calculator 224 included in the synchronization coefficient generator 220. The synchronization coefficient calculator 224 sets the sound reception range Rs, the suppression range Rn, and the shift range Rt on the basis of the minimum sound reception range Rsmin and the target sound likelihood D(f) and calculates a synchronization coefficient as described previously.

Referring to FIG. 8A, the face of a talker is on the left side of the talker direction detection sensor 192. For example, the talker direction detection sensor 192 detects a center position θ of a face area A of the talker at an angle $\theta=\theta1=-\pi/4$ as an angular position in the minimum sound reception range Rsmin. In this case, the direction determiner 194 sets the angular range of the minimum sound reception range Rsmin narrower than an angle π on the basis of the detection data of $\theta=\theta1$ so that the minimum sound reception range Rsmin covers the whole of the face area A.

Referring to FIG. 8B, the face of a talker is on the lower or front side of the talker direction detection sensor 192. For example, the talker direction detection sensor 192 detects the center position θ of the face area A of the talker at an angle $\theta=\theta2=0$ as an angular position in the minimum sound reception range Rsmin. In this case, the direction determiner 194 sets the angular range of the minimum sound reception range Rsmin narrower than the angle π on the basis of the detection data of $\theta=\theta2$ so that the minimum sound reception range Rsmin covers the whole of the face area A. Instead of the face position, the position of a body of the talker may be detected.

When the talker direction detection sensor 192 is a digital camera, the direction determiner 194 recognizes image data obtained by the digital camera, determines the face area A and the center position θ of the face area A, and sets the minimum sound reception range Rsmin on the basis of the face area A and the center position θ of the face area A.

Thus, the direction determiner 194 may variably set the minimum sound reception range Rsmin on the basis of the position of a face or body of a talker detected by the talker direction detection sensor 192. Alternatively, the direction determiner 194 may variably set the minimum sound reception range Rsmin on the basis of key input data. By variably setting the minimum sound reception range Rsmin, it is possible to minimize the minimum sound reception range Rsmin and suppress unnecessary noise at each frequency in the wide suppression range Rn.

Referring back to FIGS. 1, 4A, and 4B, when the target sound likelihood D(f) transmitted from the target sound likelihood determiner 218 is D(f)≥0.5, the synchronization coefficient calculator 224 may set the angular boundary of the sound reception range Rs=Rsmax illustrated in FIG. 4A to $\theta tb=+\pi/2$, that is, set the whole angular range as the sound reception range. That is, when the target sound likelihood D(f) is D(f)≥0.5, a sound reception range and a suppression range may not be set and transmitted sound may be processed as a target sound signal. When the target sound likelihood D(f) transmitted from the target sound likelihood determiner 218 is D(f)<0.5, the synchronization coefficient calculator 224 may set the angular boundary of the suppression range Rn=Rnmax illustrated in FIG. 4B to $\theta tamin=-\pi/2$, that is, set the whole angular range as the suppression range. That is, when the target sound likelihood D(f) is D(f)<0.5, a sound reception range and a suppression range may not be set and transmitted sound may be processed as a noise sound signal.

Figure 9:
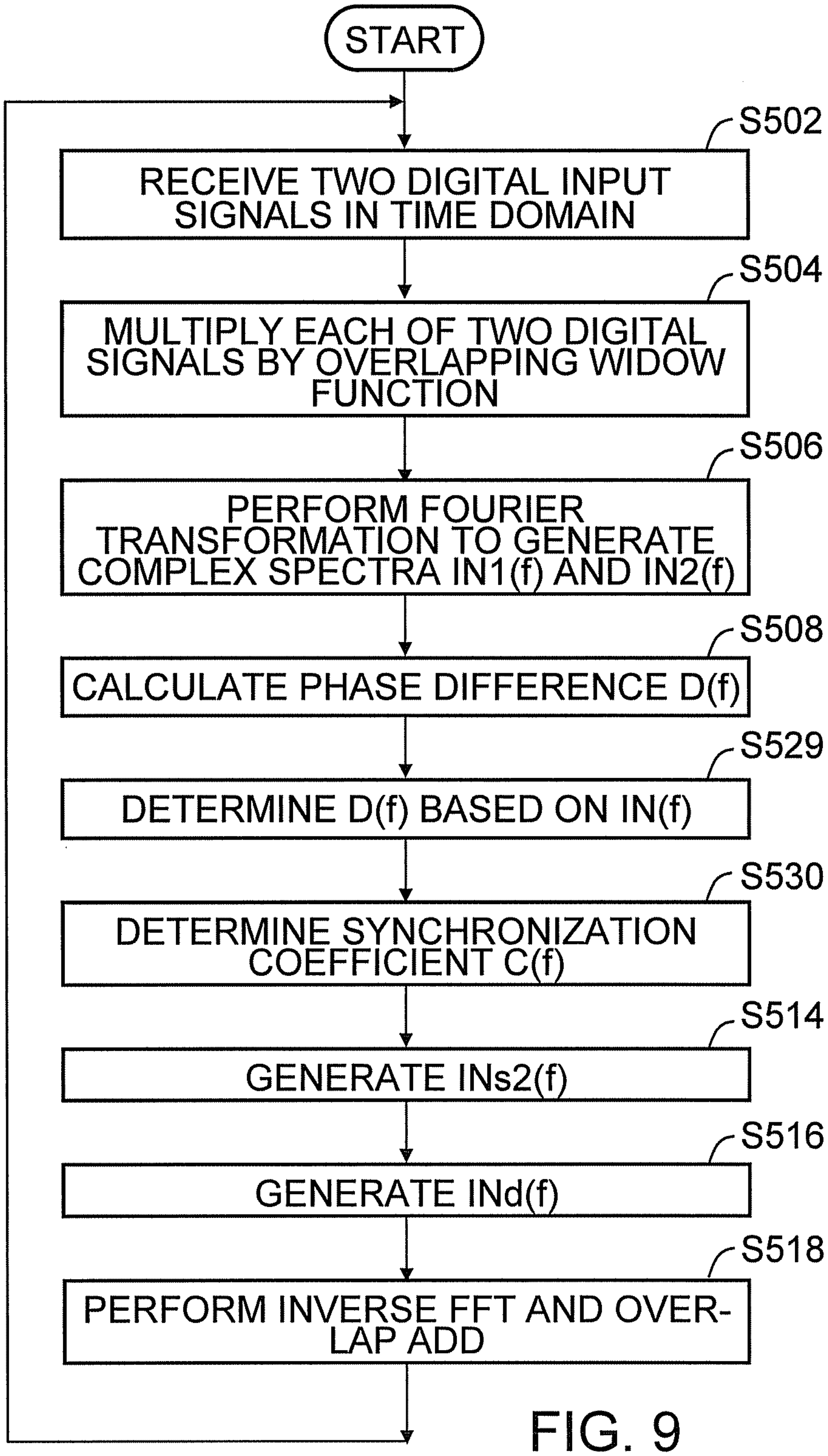
FIG. 9 is a flowchart illustrating another complex spectrum generation process performed by the digital signal processor illustrated in FIG. 3A in accordance with a program stored in a memory.

FIG. 9 is a flowchart illustrating another complex spectrum generation process performed by the digital signal processor 200 illustrated in FIG. 3A in accordance with a program stored in the memory 202.

The process from S502 to S508 has already been described with reference to FIG. 7.

In S529, the digital signal processor 200 (the target sound likelihood determiner 218) generates the target sound likelihood D(f) ($0 \le D(f) \le 1$) on the basis of the absolute value or amplitude of the complex spectrum IN1(*f*) transmitted from the fast Fourier transformer 212 and supplies the target sound likelihood D(f) to the synchronization coefficient generator 220. The digital signal processor 200 (the synchronization coefficient calculator 224 included in the synchronization coefficient generator 220) determines for each frequency f whether transmitted sound is processed as a target sound signal or a noise signal in accordance with the value of the target sound likelihood D(f).

In S530, the digital signal processor 200 (the synchronization coefficient calculator 224 included in the synchronization coefficient generator 220) calculates the ratio C(f) of the complex spectrum of a signal input into the microphone MIC1 to the complex spectrum of a signal input into the microphone MIC2 on the basis of the phase difference DIFF (f) using the following equation as described previously.

(a) When the target sound likelihood D(f) is $D(f)<0.5$, the synchronization coefficient C(f) is calculated as follows: $C(f,i)=Cn(f,i)=\alpha C(f,i-1)+(1-\alpha)IN1(f,i)/IN2(f,i)$. (b) When the target sound likelihood D(f) is $D(f)\ge 0.5$, the synchronization coefficient C(f) is calculated as follows: $C(f)=Cs(f)=\exp(-j2\pi f/fs)$ or $C(f)=Cs(f)=0$.

The process from S514 to S518 has already been described with reference to FIG. 7.

Thus, by determining a synchronization coefficient on the basis of only the target sound likelihood D(f) without adjusting or setting a sound reception range and a suppression range, it is possible to simplify the generation of a synchronization coefficient.

As another method of determining the target sound likelihood D(f), the target sound likelihood determiner 218 may receive the phase difference DIFF(f) from the phase difference calculator 222 and receive information representing the minimum sound reception range Rsmin from the direction determiner 194 or the processor 10 (see, dashed arrows illustrated in FIG. 3A). When the phase difference DIFF(f) calculated by the phase difference calculator 222 is in the minimum sound reception range Rsmin illustrated in FIG. 6C received from the direction determiner 194, the target sound likelihood determiner 218 may determine that the target sound likelihood D(f) is high and D(f)=1. On the other hand, when the phase difference DIFF(f) is in the maximum suppression range Rnmax or the shift range Rt illustrated in FIG. 6C, the target sound likelihood determiner 218 may determine that the target sound likelihood D(f) is low and D(f)=0. In S509 illustrated in FIG. 7 or S529 illustrated in FIG. 9, the above-described method of determining the target sound likelihood D(f) may be used. In this case, the digital signal processor 200 also performs S510 to S518 illustrated in FIG. 7 or S530 and S514 to S518 illustrated in FIG. 9.

Instead of synchronization subtraction performed for noise suppression, synchronization addition may be performed for the emphasis of a sound signal. In this case, when a sound reception direction is in a sound reception range, the synchronization addition is performed. When a sound reception direction is in a suppression range, the synchronization addition is not performed and the addition ratio of an addition signal is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing apparatus comprising:

a first calculator to obtain phase difference between two spectrum signals in a frequency domain transformed from sound signals received by at least two microphones for each frequency in a certain frequency band, each of the two spectrum signals including frequency components;

a second calculator to obtain, for each frequency component of one spectrum signal of the two spectrum signals, a value representing a target signal likelihood dependent on a value of the frequency component, and to determine whether the frequency component includes noise on the basis of the value representing the target signal likelihood obtained for the frequency component; and a filter to, when the second calculator determines that a respective frequency component includes noise, generate a synchronized spectrum signal by synchronizing the respective frequency component of one of the two spectrum signals to the respective frequency component of the other of the two spectrum signals by phase shifting on the basis of the phase difference obtained by the first calculator, and to generate a filtered spectrum signal by subtracting the synchronized spectrum signal from the other of the two spectrum signals or adding the synchronized spectrum signal to the other of the two spectrum signals.

2. A signal processing apparatus for suppressing a noise comprising:

a first calculator to obtain a phase difference between two spectrum signals in a frequency domain transformed from sound signals received by at least two microphones and to estimate a sound source by the phase difference;

a second calculator to obtain a value representing a target signal likelihood and to determine a sound suppressing phase difference range at each frequency, in which a sound signal is suppressed, on the basis of the target signal likelihood; and a filter to generate a synchronized spectrum signal by synchronizing each frequency component of one of the two spectrum signals to each frequency component of the other of the two spectrum signals for each frequency when the phase difference is within the sound suppressing phase difference range and to generate a filtered spectrum signal by subtracting the synchronized spectrum signal from the other of the two spectrum signals or adding the synchronized spectrum signal to the other of the two spectrum signals.

3. The signal processing apparatus according to claim 2, wherein the second calculator sets the phase difference range narrower and a sound receiving phase difference range wider, in which the noise is not suppressed in accordance with increase in the value representing the target signal likelihood.

4. The signal processing apparatus according to claim 2, further comprising a determiner to determine the value representing the target signal likelihood on the basis of an absolute value of an amplitude of one of the two spectrum signals or a square of the absolute value.

5. The signal processing apparatus according to claim 2, further comprising a determiner to determine the value representing the target signal likelihood on the basis of a ratio of a current absolute value of an amplitude of one of the two spectrum signals or a square of the current absolute value to a time average value of an absolute value of the amplitude or of a square of the absolute value.

6. The signal processing apparatus according to claim 2, further comprising a synchronization coefficient generator to receive a talker direction information and to set the sound suppressing phase difference range on the basis of the talker direction information, the talker direction information being corresponding to information of a direction toward the talker.

7. The signal processing apparatus according to claim 2, wherein the filter generates the filtered spectrum signal by subtracting a product of an adjusting coefficient and the synchronized spectrum signal from the other of the two spectrum signals, the adjusting coefficient being determined in accordance with the phase difference being within the sound suppressing phase difference range or not, the adjusting coefficient being adjusting a degree of a subtraction in accordance of the frequency.

8. The signal processing apparatus according to claim 2, further comprising a orthogonal transformer to transform at least two sound signals in a time domain into the two spectrum signals in a frequency domain, wherein the phase difference is corresponding to a sound arrival direction at an arrangement of the microphones, the target signal likelihood is a target sound signal likelihood, and the second calculator calculates each synchronization coefficient associated with each amount of phase shift for synchronizing each frequency component of one of the two spectrum signals to each frequency component of the other of the two spectrum signals for each frequency.

9. The signal processing apparatus according to claim 7, wherein the second calculator calculates, for each time frame, the synchronization coefficient based on a ratio of both of the two spectrum signals for each frequency when the phase difference is within the sound suppressing phase difference range.

10. The signal processing apparatus according to claim 3, further comprising a determiner to determine the value representing the target signal likelihood on the basis of an absolute value of an amplitude of one of the two spectrum signals or a square of the absolute value.

11. The signal processing apparatus according to claim 3, further comprising a determiner to determine the value representing the target signal likelihood on the basis of a ratio of a current absolute value of an amplitude of one of the two spectrum signals or a square of the current absolute value to a time average value of an absolute value of the amplitude or of a square of the absolute value.

12. The signal processing apparatus according to claim 3, further comprising a synchronization coefficient generator to receive a talker direction information and to set the sound suppressing phase difference range on the basis of the talker direction information, the talker direction information being corresponding to information of a direction toward the talker.

13. The signal processing apparatus according to claim 3, wherein the filter generates the filtered spectrum signal by subtracting a product of an adjusting coefficient and the synchronized spectrum signal from the other of the two spectrum signals, the adjusting coefficient being determined in accordance with the phase difference being within the sound suppressing phase difference range or not, the adjusting coefficient being adjusting a degree of a subtraction in accordance of the frequency.

14. The signal processing apparatus according to claim 3, further comprising a orthogonal transformer to transform at least two sound signals in a time domain into the two spectrum signals in a frequency domain, wherein the phase difference is corresponding to a sound arrival direction at an arrangement of the microphones, the target signal likelihood is a target sound signal likelihood, and the second calculator calculates each synchronization coefficient associated with each amount of phase shift for synchronizing each frequency component of one of the two spectrum signals to each frequency component of the other of the two spectrum signals for each frequency.

15. A signal processing method using two spectrum signals in a frequency domain transformed from sound signals received by at least two microphones, each of the two spectrum signals including frequency components, the method comprising:

obtaining a phase difference between the two spectrum signals for each frequency in a certain frequency band;

obtaining, for each frequency component of one spectrum signal of the two spectrum signals, a value representing a target signal likelihood dependent on a value of the frequency component;

determining, for each frequency component of said one spectrum signal of the two spectrum signals, whether the frequency component includes noise on the basis of the value representing the target signal likelihood obtained for the frequency component; and when said determining determines that a respective frequency component includes noise, generating a synchronized spectrum signal by synchronizing the respective frequency component of one of the spectrum signals to the respective frequency component of the other of the spectrum signals by phase shifting on the basis of the obtained phase difference, and generating a filtered spectrum signal by subtracting the synchronized spectrum signal from the other of the spectrum signals or adding the synchronized spectrum signal to the other of the spectrum signals.

* * * * *